Nov. 11, 1947.  W. A. ANDERSON ET AL  2,430,547
START-STOP ELECTRONIC REGENERATIVE TELEGRAPH SIGNAL REPEATER
Filed Oct. 28, 1943  2 Sheets-Sheet 1

INVENTORS
Richard E. Mathes
Warren A. Anderson
BY
ATTORNEY

Patented Nov. 11, 1947

2,430,547

UNITED STATES PATENT OFFICE 2,430,547

START-STOP ELECTRONIC REGENERATIVE TELEGRAPH SIGNAL REPEATER

Warren A. Anderson, New Dorp, Staten Island, N. Y., and Richard E. Mathes, Silver Spring, Md., assignors to Radio Corporation of America, a corporation of Delaware Application October 28, 1943, Serial No. 507,974

7 Claims. (Cl. 178—70)

This invention relates to regenerating circuits for telegraph printers, particularly those of the start-stop type.

It is an object of the invention to regenerate the incoming signals before passing them to the start-stop or other printer to eliminate the effects of varying line levels, noise clicks, etc.

Another object of the invention is to regenerate the incoming signals for start-stop or other printers by means of a multivibrator and amplifier limiter working into a locking circuit.

Figure 1:
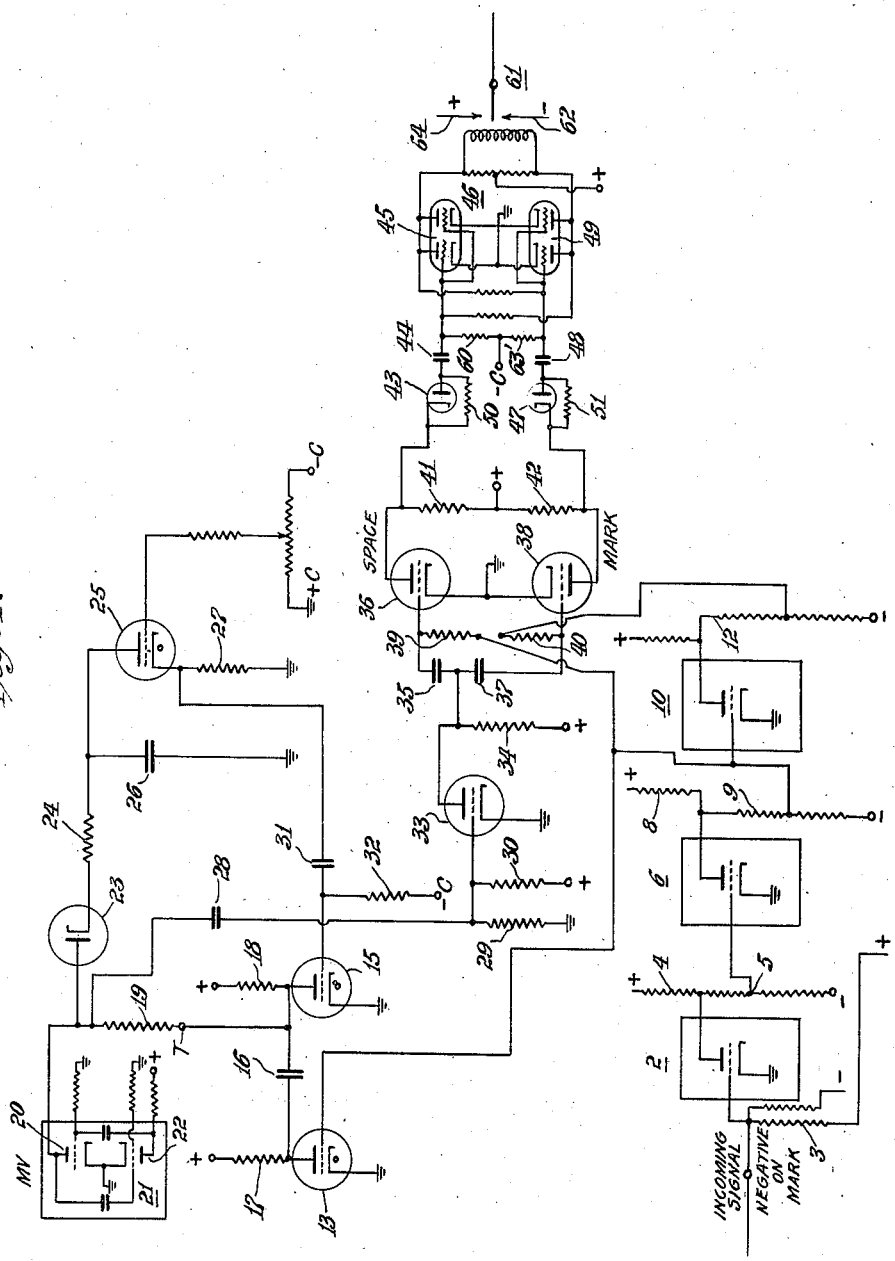

Other objects of the invention will appear in the following description, reference being had to the drawings, in which:

Figure 1 of the drawing is a diagrammatic illustration of the circuits of the invention.

Figure 2:
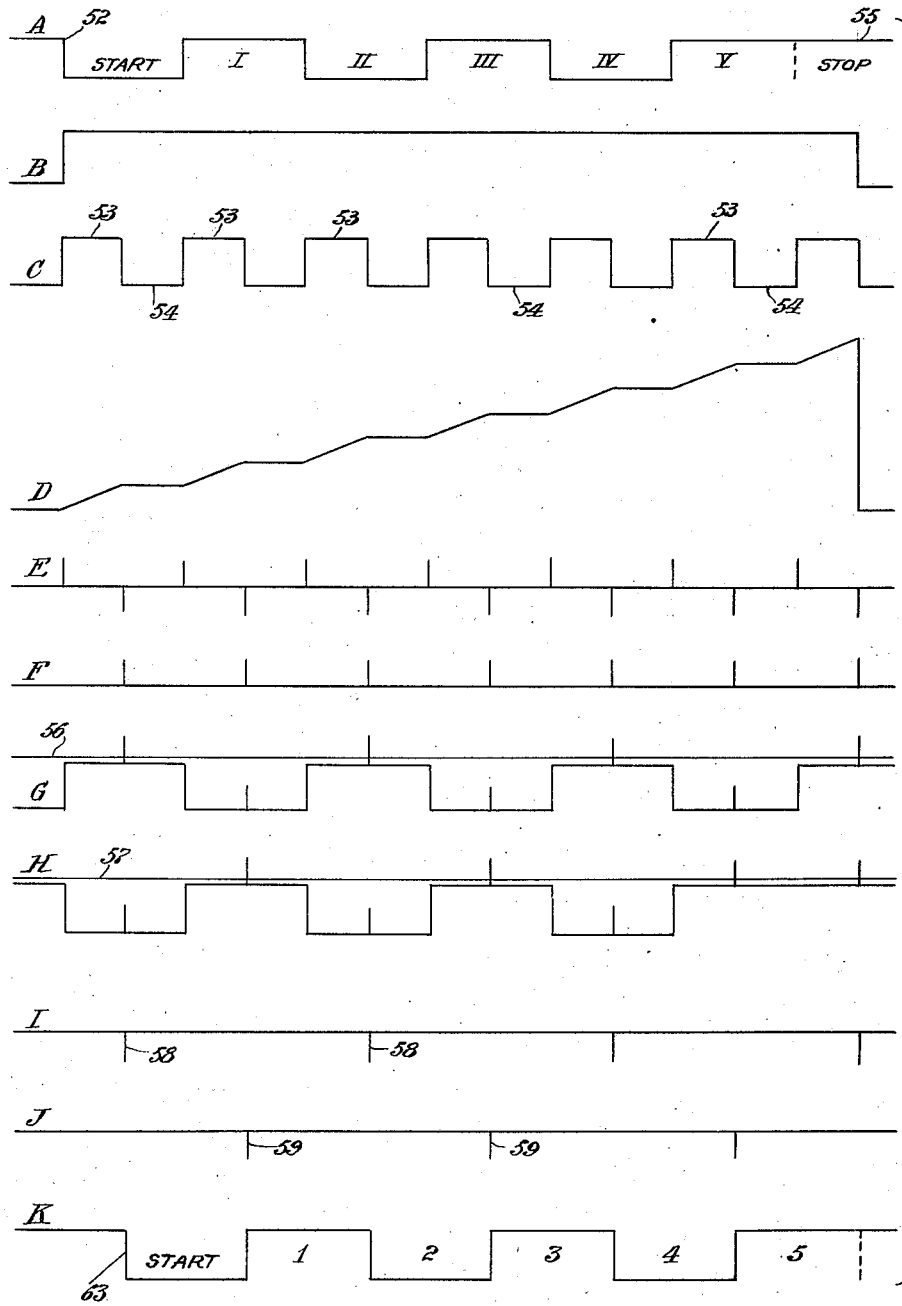

Figure 2 is a series of graphs drawn to the same time scale but not necessarily the same voltage scale.

Referring to the drawings, the incoming signal is applied to the grid of a limiter amplifier 2. This grid is also connected through resistance 3 to positive potential to produce limitation. The plate is connected through resistance 4 of the voltage divider to a positive terminal of the supply source and is connected through resistance 5 of such divider to the grid of limiter amplifier 6. The plate of amplifier 6 is connected through resistance 8 of the voltage divider to a positive terminal of the supply source and through resistance 9 of the voltage divider to the grid of limiter amplifier 10. The plate is connected to an appropriate point in voltage divider 12 across the supply source.

The cathodes of all three limiter amplifiers are connected to ground, which is the +C terminal, as well as the negative terminal of the power supply.

The plate of limiter amplifier 6 is connected to the grid of thyratron tube 13 through resistance 9 of the voltage divider. The plate of thyratron tube 13 is connected to the plate of thyratron tube 15 by commutating condenser 16. The plates of tubes 13 and 15 are connected through resistances 17, 18, respectively, to a positive terminal of the supply source and the cathodes are grounded. The plate of thyratron 15 is connected through resistance 19 to the plate 20 of a multivibrator 21, which, per se, is well known in the art.

The plate 22 of multivibrator 21 is connected through an appropriate resistance to the positive terminal of the power supply. The grids of both multivibrator tubes are connected to ground through appropriate grid leaks. The plate of one tube in the multivibrator is connected through a condenser to the grid of the other, as in the usual construction. The cathodes are grounded. The constants of the multivibrator are so chosen that it oscillates at, or substantially at, a frequency equal to the signal element rate; that is, one cycle for each signal unit. The terminal T of the plate 20 of the multivibrator has only about 15 volts when thyratron 15 is conducting and the constants chosen will not permit it to oscillate. It can do so only when it has a higher voltage when thyratron tube 15 is quenched.

The plate 20 of the multivibrator is connected to the plate of diode 23 and the cathode of this diode is connected through resistance 24 to the plate of thyratron 25. Condenser 26 is bridged between the plate of this thyratron and ground. The cathode of this thyratron is connected to ground through cathode resistor 27 and the grid is connected to a suitable point in the negative bias source, the terminals of which are given the usual designation +C and —C.

The plate 20 of the multivibrator 21 is connected to ground by a differentiating circuit consisting of condenser 28 and resistances 29 and 30. The plate 20 is connected through condenser 28 and resistance 29 to ground and through condenser 28 and resistance 30 to the positive terminal.

The grid of thyratron 15 is connected through condenser 31 to the cathode of thyratron 25. It is also connected through resistance 32 to the negative bias terminal.

The grid of amplifier 33 is connected to a point between condenser 28 and resistance 29. The positive bias of this tube is such that only negative potential changes in its grid circuit produce changes in its plate current. The cathode of tube 33 is grounded. The plate is connected through resistance 34 to positive potential, through condenser 35 to the grid of keying tube 36 and through condenser 37 to the grid of keying tube 38. The grid of tube 36 is also connected through resistance 39 to the plate of limiter amplifier 6 through resistance 9 and the grid of tube 38 is connected through resistance 40 to an appropriate point in voltage divider 12. Thus, signal voltage is applied to the grids of the keying tubes in opposite phase. The plates of tubes 36 and 38 are connected through resistances 41 and 42, respectively, to the positive terminal of the supply source. The plate of tube 36 is connected through diode 43 and condenser 44 to the grid of dual amplifier 45 of locking circuit 46 and the plate of tube 38 is connected through diode 47 and condenser 48 to the grid of dual amplifier tube 49. This locking circuit is of the Finch type, such as disclosed in the application of Alfred Kahn and Warren A. Anderson, Serial No. 466,094, filed November 19, 1942 now Patent No. 2,359,649 granted Oct. 3, 1944.

Condensers 44 and 48 charge through resistances 50 and 51, respectively, at a relatively slow rate, which does not unbalance the locking circuit. They discharge suddenly through the diodes 43 and 47 when the tubes 36 and 38 are rendered conducting, which does unbalance the locking circuit. The latter tubes are blocked by the applied negative bias and are unblocked, or almost unblocked, by the signals applied through tubes 6 and 10, respectively. Tube 36 is unblocked on space signals and tube 38 on mark signals.

The operation of our invention is described as follows:

In the well-known start-stop printer, a plurality of signal code units of equal length produce the printing operation. In one well-known system there are five code units plus a start unit and a stop unit. In another there are seven code units with the same start and stop units. The principles of our invention are applicable to a printer of any number of code units, but by way of example we have disclosed it in connection with circuits for a five-unit code.

Suppose the incoming signal units are for the letter Y of the five-unit code. As shown in graph A, the "start" unit is a space (no current). This starts the printing operation, as is well known. Thyratron 15 is conducting and thyratron 13 is blocked before the start signal is received. (The reason for this will appear later.) As indicated in Fig. 1, the negative start signal (space) is applied as a positive voltage to the grid of limiter amplifier 2 through the incoming line and lowers the plate potential. This causes the potential of the plate of limiter amplifier 6 to rise and that of the plate of limiter amplifier 10 to lower, as will be appreciated. The increased plate voltage of amplifier 6 decreases the negative bias in thyratron 13 and fires it at point 52 of the graphs in Figure 2. Condenser 16 substantially simultaneously quenches thyratron 15 by well-known commutating action. Prior to this, multivibrator 21 was not oscillating, due to low plate voltage from the drop in resistance 18. When tube 15 is quenched, as described, the voltage at terminal T rises to line value and multivibrator 21 starts to oscillate. The plate voltage supplied to the terminal T of the multivibrator circuit is indicated by graph B and the alternating component of the voltage between plate 20 and ground is indicated by graph C, the high values being designated by 53 and the low ones by 54. It will be seen from graph C that the voltage of the multivibrator is a rectangular wave beginning with the start signal and having one cycle for each element of the signal. Condenser 26 receives a partial charge through diode 23 and resistance 24 at each half cycle 53. Since it cannot discharge from cathode to anode through the diode during the half cycles 54, it retains its partial charge and the voltage increases step by step, as shown in graph D. The negative bias in thyratron 25 is such that it cannot strike from the voltage applied to condenser 26 until seven positive half cycles 53 of the multivibrator are completed, that is, at point 55 in graph D. At this time thyratron 25 fires. This instantly discharges condenser 26 down to the extinction voltage of the thyratron, which is approximately 15 volts.

The discharge current of condenser 26 produces a voltage drop in cathode resistor 27, which differentiates a positive voltage pulse in resistance 32 through condenser 31. This reduces the negative bias applied to the grid of thyratron tube 15 so that it strikes at point 55 and simultaneously quenches thyratron 13 by action of condenser 16. Due to the drop in resistance 18, the voltage of plate 20 is greatly reduced and the multivibrator ceases to oscillate. The time indicated at point 55 is reached a half element after the fifth signal element is received. Thus, the multivibrator starts with the beginning of the "start" signal and stops a half element after the start of the "stop" signal.

To explain how the multivibrator controls the regeneration of the signals, we will return to the start of the signal, when the multivibrator first began to oscillate at point 52, as just described. At the beginning of the start signal and at the beginning of each succeeding multivibrator cycle, a positive voltage pulse was differentiated in the input circuit of tube 33 by the charging of condenser 28 through resistance 29 and at the centers of the elements a negative pulse was produced therein by the discharge of that condenser through resistance 29. Graph E indicates this series of pulses. Since tube 33 is positively biased at its upper plate current limit by resistances 30 and 29, the positive pulses produce no change in the plate current but the negative pulses reduce the plate current and produce positive plate-cathode voltage pulses, as indicated by graph F. These positive voltage pulses are applied to the input circuits of keying tubes 36 and 38 in parallel, where they mix with the signals applied in opposite phase thereto. In the former tube, they mix with the signal output of tube 6, as shown in graph G, and in the latter, with the signal output of tube 10, as shown in graph H.

Tubes 36 and 38 have a blocking negative grid bias with the cut-off slightly above, or near, the top of the positive signal halves, as indicated at 56 and 57, respectively. It will thus be seen from graphs A, G and H that the plate voltage pulses of tube 33 will cause tube 36 to conduct during the spaces and produce dips or negative pulses 58 in its plate voltage, as shown at graph I. This occurs at the centers of the spaces of the signal, as shown by the graphs in Figure 2. Tube 38 is blocked during the spaces, but during the marks the signal raises the grid voltage to the conducting point 57. The pulses in the plate voltage of tube 33 then cause tube 38 to momentarily conduct and produce dips or negative pulses in the plate current, as shown at 59 in graph J.

The pulses 58 in the plate voltage of tube 36 cause condenser 44 in the locking circuit 46 to discharge suddenly through diode 43, the plate-cathode circuit of tube 36 and up through grid resistor 60. This throws the locking circuit so that tubes 45 are blocked and tubes 49 conduct. Polarized relay 61 then throws its tongue to one terminal, say the negative 62, and the "start" space 63 of the regenerated signal in graph K begins at the center of the first, or "start," space in graph A. When the negative pulse 59 of graph J occurs, condenser 48 discharges through diode 47 and tube 38 to produce a negative potential in grid resistor 63'. This throws the locking circuit by blocking tubes 49 and causing tubes 45 to conduct. The relay 61 then throws its switch tongue against the other or positive contact 64 to end the space and start the regenerated mark at the center of the first mark of the received signal. In this way, the regenerated spaces and marks are produced in accordance with the voltage at the centers of the signal elements, which is least likely to be mutilated in transmission and reception. This produces the most reliable signals for feeding to the printer, which is connected to the tongue of the polar relay 61.

We have shown our invention in a particular embodiment, but this is by way of example only. Various modifications may be made without departing from the spirit of the invention.

Having described our invention, what we claim is:

1. In regeneration of start-stop signals, a multivibrator having a frequency substantially equal to the signal element rate, means for starting the multivibrator to oscillate at the beginning of the start signal of a character, a condenser, an electric valve, means for building up the charge in said condenser by delivering a partial charge thereto through said valve in each positive half cycle of the voltage wave of said multivibrator, a blocked tube having said condenser connected to its output terminals, said condenser being adapted to unblock said tube and discharge through its output circuit after receiving the partial charge from the multivibrator voltage wave in the first half of the stop signal.

2. In the regeneration of start-stop signals, a multivibrator having a frequency substantially equal to the signal element rate, means for starting the multivibrator to oscillate at the beginning of the start signal of a character, a condenser, an electric valve, means for building up the charge in said condenser by delivering a partial charge thereto through said valve in each positive half cycle of the voltage wave of said multivibrator, a blocked tube having said condenser connected to its output terminals, means whereby said tube unblocks and discharges said condenser after it has received the partial charge from the multivibrator voltage wave in the first half of the stop signal and means for stopping the multivibrator oscillations upon discharge of said condenser.

3. In regeneration of start-stop signals, a generator having a frequency substantially equal to the signal element rate, means for starting the generator into the production of oscillations during the start signal of a character, a condenser, a diode, means whereby said generator charges up said condenser by delivering a partial charge thereto through said diode in each positive half cycle of its oscillations, and a thyratron tube having said condenser connected to its output terminals, said condenser firing said tube and discharging therethrough after it has received the partial charge from the generator during the stop signal.

4. In regeneration of start-stop signals, a generator having a frequency substantially equal to the signal element rate, means for starting the generator into the production of oscillations during the start signal of a character, a condenser, a diode, means whereby said generator charges up said condenser by delivering a partial charge thereto through said diode in each positive half cycle of its oscillations, a thyratron tube having said condenser connected to its output terminals, said condenser firing said tube and discharging therethrough after it has received the partial charge from the generator during the stop signal, and means for stopping the generator oscillations upon discharge of said condenser.

5. In regeneration of start-stop signals, a multivibrator having a frequency substantially equal to the signal element rate, means for starting the multivibrator to oscillate in the first signal element, a condenser, an electric valve, means for building up the charge in said condenser by delivering a partial charge thereto through said valve in each voltage cycle of said multivibrator, a blocked tube having said condenser connected to its output terminals, said condenser being adapted to unblock said tube and discharge through its output circuit after receiving the charge from the multivibrator voltage wave during the stop signal.

6. In regeneration of start-stop signals, a multivibrator having a frequency substantially equal to the signal element rate, means for starting the multivibrator to oscillate at the beginning of the start signal of a character, a condenser, an electric valve, means for building up the charge in said condenser by delivering a partial charge thereto through said valve in the odd half cycle of said multivibrator, a blocked tube having said condenser connected to its output terminals, said condenser being adapted to unblock said tube and discharge through its output circuit after receiving the charge from the multivibrator voltage wave in the first half of the stop signal, means for stopping the multivibrator oscillations upon discharge of said condenser, a signal regenerating relay and means for operating said relay at the beginning of the even half cycles of said multivibrator.

7. In regeneration of start-stop signals, a multivibrator having a frequency substantially equal to the signal element rate, means for starting the multivibrator to oscillate at the beginning of the start signal of a character, a condenser, an electric valve, means for building up the charge in said condenser by delivering a partial charge thereto through said valve in the odd half cycles of said multivibrator, a blocked tube having said condenser connected to its output terminals, said condenser being adapted to unblock said tube and discharge through its output circuit after receiving the charge from the multivibrator voltage wave in the first half of the stop signal, means for stopping the multivibrator oscillations upon discharge of said condenser, a signal regenerating relay, means for producing a potential at the beginning of the odd half cycles of said multivibrator, means for combining said potentials with the potentials of the signal marks and spaces occurring simultaneously therewith and means controlled by said combined potentials for operating said relay.

WARREN A. ANDERSON.
RICHARD E. MATHES.

REFERENCES CITED

The following references are of record in the file of this patent:

UNITED STATES PATENTS

| Number | Name | Date |
| --- | --- | --- |
| 1,771,445 | Parker | July 29, 1930 |
| 1,771,446 | Parker | July 29, 1930 |
| 2,133,456 | Kinkead | Oct. 18, 1938 |
| 2,050,059 | Koch | Aug. 4, 1936 |
| 2,212,967 | White | Aug. 27, 1940 |
| 2,342,318 | Wilkerson | Feb. 22, 1944 |
| 2,098,051 | Lord | Nov. 2, 1937 |
| 2,338,395 | Bartelink | Jan. 4, 1944 |